Oct. 6, 1964   W. RODENACKER   3,151,353
APPARATUS FOR PLASTICIZING
Filed June 11, 1963   3 Sheets-Sheet 1

INVENTOR.
WOLF RODENACKER
BY
Burgess, Dinklage & Sprung
ATTORNEY

Oct. 6, 1964          W. RODENACKER          3,151,353
                   APPARATUS FOR PLASTICIZING
Filed June 11, 1963                        3 Sheets-Sheet 2

INVENTOR.
WOLF RODENACKER
BY
Burgess, Dinklage & Sprung
ATTORNEY

Oct. 6, 1964   W. RODENACKER   3,151,353
APPARATUS FOR PLASTICIZING
Filed June 11, 1963   3 Sheets-Sheet 3

INVENTOR.
WOLF RODENACKER
BY
Burgess, Dinklage & Sprung
ATTORNEY

United States Patent Office 3,151,353
Patented Oct. 6, 1964

3,151,353
APPARATUS FOR PLASTICIZING
Wolf Rodenacker, Dormagen, Germany, assignor to Farbenfabriken Bayer Aktiengesellschaft, Leverkusen, Germany, a corporation of Germany
Filed June 11, 1963, Ser. No. 286,993
3 Claims. (Cl. 18—2)

The invention relates to an apparatus for plasticizing viscous substances, particularly synthetic resins, and for incorporating dyestuffs and plasticizers in these substances as described in my copending application Serial No. 231,426, filed October 18, 1962, which apparatus comprises a roller which is rotatably arranged in a housing and which, together with at least two fittings arranged in the housing, forms a wedge-shaped gap in which the material accumulates and is worked through.

In order that the invention may be more thoroughly understood and be more readily carried into effect some examples of machines in accordance with the invention will be described with reference to the accompanying drawings, in which FIG. 1 is a cross-section through a machine in accordance with the invention, in which only essential parts of the machine are shown;

Figure 1:
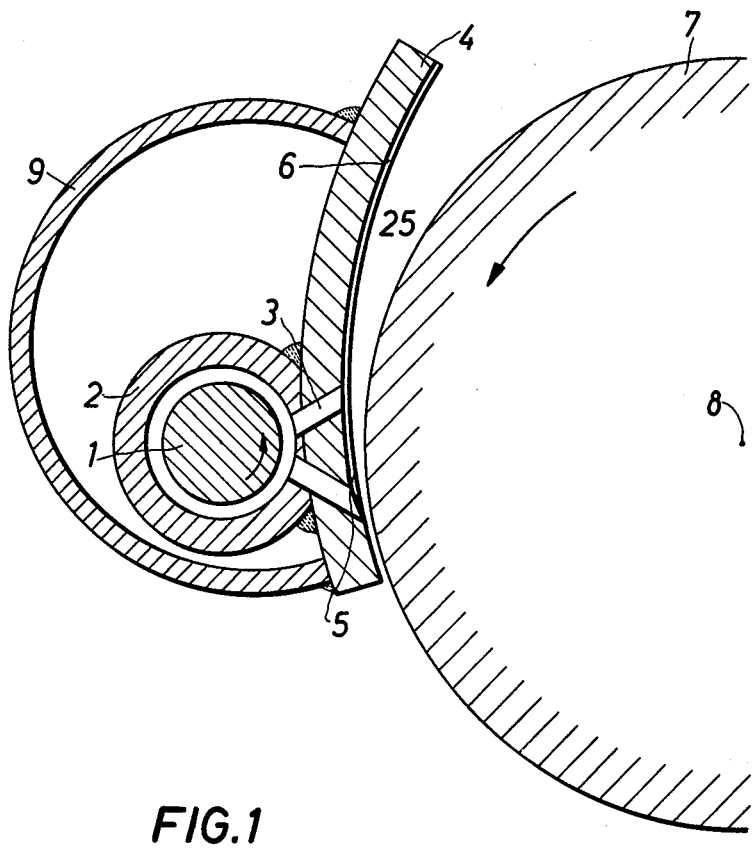

The material to be worked is delivered to the roller by means of a bore in the housing and is conveyed from the roller to the gap. The material preferably enters the gap at the point of maximum pressure of the material.

It has now been found that the apparatus as well as its mode of operation may be simplified if, in accordance with the invention, the built-in parts mentioned above are in the form of cups on the side facing the roller, these cups being provided, on their surface remote from the roller, with a screw housing containing a rotatable conveyor screw which has its axis parallel to the axis of the roller, the conveyor space formed by the screw being connected with the wedge-shaped gap by two bores one of which opens on to the wide end of the wedge-shaped gap at one end of the roller while the other bore opens on the narrow part of the wedge-shaped gap at the other end of the roller. The conveyor screw projects from both ends of the housing of the roller so that the means for supplying and removing the material may be attached. The cup shaped parts and the screw housing are preferably heatable, e.g. by means of a heating jacket or electrical heating means.

The material can be treated very accurately over a very short path by means of this screw which conveys it into and out of the wedge-shaped gap, particularly when the apparatus is a closed apparatus for evaporating solvents or secondary ingredients from the material, e.g. for removing water from viscous or plastic materials.

If, in addition, grooves are arranged on the surface of the cup-shaped part, preferably running obliquely over the surface, the material will automatically be conveyed through the apparatus, even if it is very viscous. Several built-in members may be provided to form a gap with the roller, without providing a conveyor worm. In that case, the gap serves more for mixing and stirring the material, whereas it is preferable to provide only one continuous conveyor worm in one of the cups forming the gap, for supplying and removing the material. In this way, one avoids the manual work normally involved in cutting the pelts and folding them over for mixing the material and removing the finshed material from the rubber and plastic roller frames hitherto used. This elimination of the manual work, which is dangerous to the operator, is a particular advantage of the arrangement. The heating normally required for treating synthetic resins may easily be arranged as will be explained below. The input end of the worm may be used for a preliminary plasticising stage whereas the evaporation or removal of solvents and other constituents is preferably carried out on the heated surface of the roller. Additional wedge-shaped gaps may be provided for working through the pelt applied to the roller so that fresh material is constantly brought into contact with the heated surface. The outlet end of the worm may be specially formed so that it can be used to convert the treated product into a semi-finished or finished material.

Constructional examples of the invention are shown diagrammatically in the drawing.

FIGURE 1 shows a worm 1 which rotates in the housing 2 in the direction of the arrow. The material conveyed through the worm 1 passes out through a bore 3 at the point of low pressure in a wedge-shaped gap 25 formed between a cup-shaped member 4 and a roller 7 and it is returned to the worm 1 through a bore 5 which is situated at the outlet end of the roller 7 at a point of high pressure in the wedge-shaped gap. Conveyor grooves 6 are provided on the surface of the cup-shaped member 4 to convey the material between the inlet aperture 3 and the outlet aperture 5. The roller 7 rotates about the axis 8 in the direction of the arrow, and the material coming through the bore 3 is drawn by the roller into the gap 25 formed between the cup-shaped member 4 and the roller 7, so that the material is vigorously worked through. The roller 7 is preferably provided with heating means such as steam heating. If the heat produced in working the material in the gap 25 is not sufficient or if it is necessary to heat the cup shaped member at the beginning of the process, then the cup-shaped member may be provided with a heating jacket 9 or electrical heating means, for example a heating device made of aluminum into which heating tubes are cast.

Figure 2:
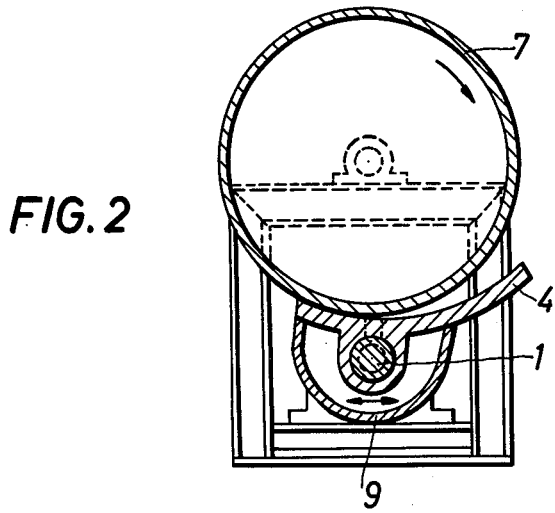
FIG. 2 is a cross-section through a machine as shown in FIG. 3, taken on the line 2—2.
Figure 3:
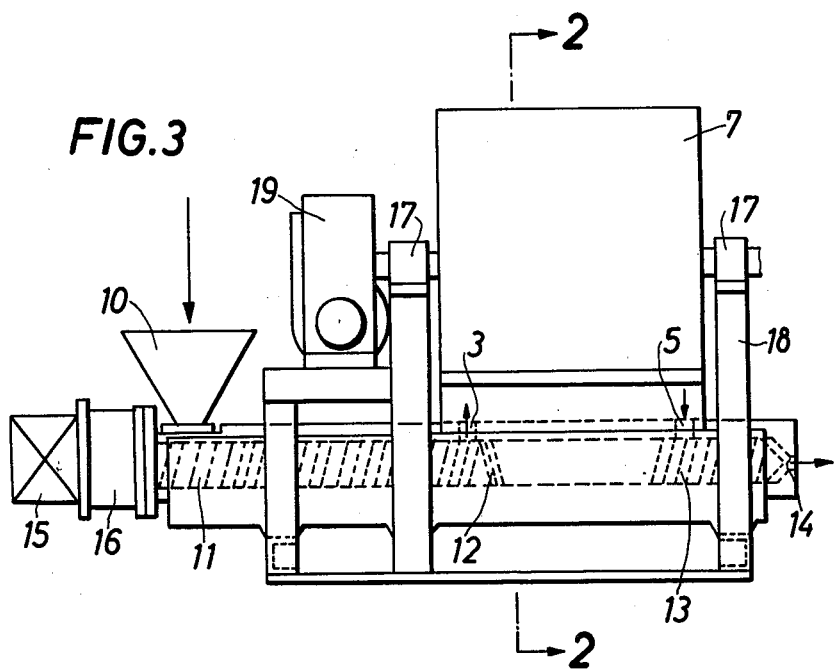
FIG. 3 is a vertical section of the machine in accordance with the invention.
Figure 4:
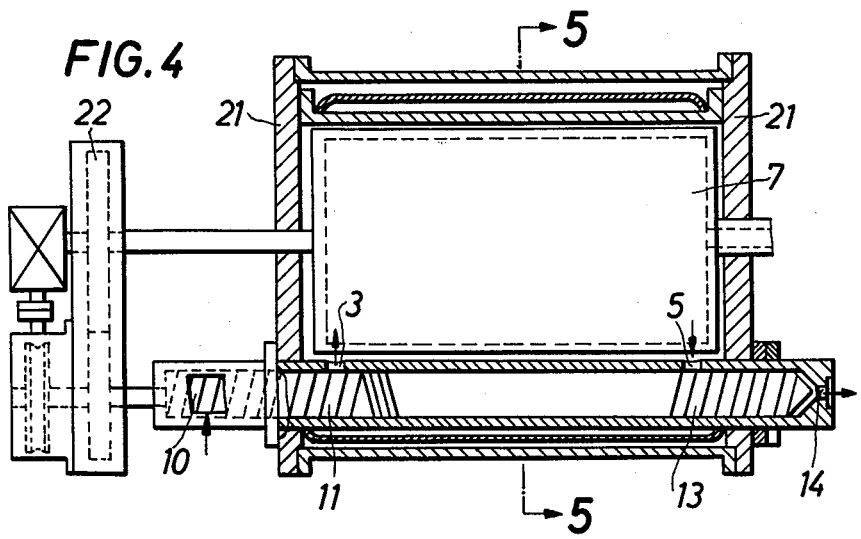
FIG. 4 is a vertical section through a modified machine.
Figure 5:
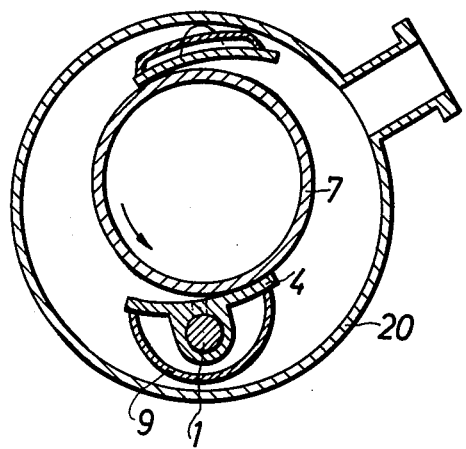
FIG. 5 is an axially transverse section on the line 5—5 in FIG. 4.

FIGURES 2 and 3 show the overall arrangement of the apparatus. The cross-section in FIGURE 2 again shows the worm 1 and the cup-shaped member 4 with heating jacket 9 which cooperates with the roller 7. In FIGURE 3, the material is supplied by a feed hopper 10 into the conveyor part of a worm 11 and passes through the bore 3 into the gap since it has been prevented by the opposing conveyor thread 12 from moving further forwards through the worm housing. At the aperture of the bore 3, the material is taken up by the roller on its shaft and pulled several times through the wedge-shaped gap and finally conveyed to the outlet aperture 5 at the end of the roller and then pressed through the outlet part of the worm 13 to an outlet 14 at the base of the worm. The worm is provided with a drive consisting of a motor 15 and a speed reducing transmission 16. The roller 7 is mounted in bearings 17 and thereby fixed to a strong framework 18. It is driven by worm gearing 19. The machine shown in FIGURES 2 and 3 may be constructed as a closed apparatus, and the housing may then be either at excess pressure or sub-atmospheric pressure (FIGS. 4 and 5).

In that case, the housing 9 and the cover 21 enclose the apparatus already described with reference to FIGURES 2 and 3, the apparatus being then driven by a different type of drive 22. In this modification the material is supplied by feed hopper 10 into the conveyor part of worm 11 and passes through the bore 3 into the gap, since it has been prevented by the opposing conveyor thread 12 from moving further forward through the worm housing. At the aperture of the bore 3, the material is taken up by the roller 7 and pulled several times through the wedge-shaped gap and finally conveyed to the outlet aperture 5 at the end of the roller. It is then pressed through the outlet part of the worm 13 to an outlet 14 at the base of the worm. The worm is provided with a drive 22 consisting of a motor 15 and a speed reducing transmission 16. Roller 7 is mounted in bearings 17 and thereby fixed to the strong framework 18. It is driven by worm gearing 19.

The apparatus according to the invention is particularly useful for treating very viscous and plastic masses which have to be mixed, worked through and subjected to an evaporating process.

I claim:

1. An apparatus for plasticizing viscous masses, and for incorporating dyestuffs and plasticizers into these masses comprising a roller rotatably arranged in a housing and forming a wedge-shaped gap with at least two built-in parts arranged in the housing, in which gap the material to be treated accumulates and is worked through, said built-in parts being in the form of cup-shaped members on the side facing said roller, the side remote from said roller being arranged on a worm housing containing a conveyor worm which has its axis parallel to the axis of said roller, the conveyor space of the worm communicating with said wedge-shaped gap by two bores one of which opens into the wide part of the gap near one end of said roller while the other bore opens into the narrow part of the gap near the other end of said roller.

2. An apparatus as claimed in claim 1, wherein the conveyor worm projects at both ends from the roller housing.

3. An apparatus as claimed in claim 1, wherein the cup-shaped members and the worm housing are heatable.

References Cited in the file of this patent
UNITED STATES PATENTS

| | | |
|---|---|---|
| 1,262,246 | Pieler | Apr. 9, 1918 |
| 2,264,237 | Brown | Nov. 25, 1941 |
| 2,586,607 | Brown | Feb. 19, 1952 |
| 2,645,813 | Swallow | July 21, 1953 |